(12) United States Patent
Falana et al.

(10) Patent No.: US 9,085,724 B2
(45) Date of Patent: Jul. 21, 2015

(54) ENVIRONMENTALLY FRIENDLY BASE FLUIDS AND METHODS FOR MAKING AND USING SAME

(75) Inventors: Olusegun M Falana, San Antonio, TX (US); Frank G. Zamora, San Antonio, TX (US); Edward C. Marshall, Schertz, TX (US); Sarkis R. Kakadjian, San Antonio, TX (US)

(73) Assignee: Lubri3ol Oilfield Chemistry LLC, Houston, TX (US)

(*) Notice: Subject to any disclaimer, the term of this patent is extended or adjusted under 35 U.S.C. 154(b) by 530 days.

(21) Appl. No.: 12/885,128

(22) Filed: Sep. 17, 2010

(65) Prior Publication Data

US 2012/0071367 A1    Mar. 22, 2012

(51) Int. Cl.
| | | |
|---|---|---|
| C09K 8/02 | (2006.01) | |
| C09K 8/68 | (2006.01) | |
| E21B 37/06 | (2006.01) | |
| E21B 43/26 | (2006.01) | |
| C09K 8/38 | (2006.01) | |
| C09K 8/34 | (2006.01) | |
| C09K 8/64 | (2006.01) | |

(52) U.S. Cl.
CPC ... C09K 8/38 (2013.01); C09K 8/34 (2013.01); C09K 8/64 (2013.01); *G05B 2219/31121* (2013.01); *G05B 2219/33192* (2013.01)

(58) Field of Classification Search
CPC .............. C09K 8/34; C09K 8/36; C09K 8/32
USPC .................................................. 507/103, 203
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompon | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |

(Continued)

FOREIGN PATENT DOCUMENTS

| | | | |
|---|---|---|---|
| CA | 2125513 | 1/1995 | |
| DE | 4027300 | 5/1992 | B10D 53/14 |

(Continued)

OTHER PUBLICATIONS

U.S. Appl. No. 12/750,335, filed Mar. 30, 2010, Parker.

(Continued)

*Primary Examiner* — Susannah Chung
*Assistant Examiner* — Atnaf Admasu
(74) *Attorney, Agent, or Firm* — Robert W Strozier

(57) ABSTRACT

Non-toxic, biodegradable base fluids are disclosed for use in making downhole fluids, where the base fluids include blends of paraffins, olefins, naphthenes, esters, and oxygenates, having low viscosities, having a pale-yellow color, having a flashpoint of >80° C. (175° F.) and have a pour point of about 19° F. Methods for making and using fluids include the base fluids of this invention are also disclosed.

18 Claims, No Drawings

(56) References Cited

U.S. PATENT DOCUMENTS

| | | | |
|---|---|---|---|
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffe et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,569,642 A | 10/1996 | Lin | |
| 5,624,886 A | 4/1997 | Dawson et al. | 507/217 |
| 5,635,457 A | 6/1997 | Van Slyke | |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,958,845 A | 9/1999 | Van Slyke | |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,034,037 A | 3/2000 | Van Slyke | |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,057,272 A | 5/2000 | Gee et al. | |
| 6,059,034 A | 5/2000 | Rickards et al. | 166/280.2 |
| 6,060,436 A | 5/2000 | Synder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,260,621 B1 * | 7/2001 | Furman et al. | 166/280.1 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,410,488 B1 | 6/2002 | Fefer et al. | |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | |
| 7,566,686 B2 | 7/2009 | Kippie et al. | 507/213 |
| 7,712,535 B2 | 5/2010 | Venditto et al. | |
| 7,767,628 B2 | 8/2010 | Kippie et al. | 507/102 |
| 7,897,544 B2 * | 3/2011 | Dobson et al. | 507/103 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0250666 A1 | 11/2005 | Gatlin et al. | 510/492 |
| 2006/0073981 A1 | 4/2006 | Gee | |
| 2006/0194700 A1 | 8/2006 | Gatlin et al. | 507/203 |
| 2007/0032693 A1 | 2/2007 | Gatlin et al. | 507/239 |
| 2007/0044965 A1 * | 3/2007 | Middaugh et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0197085 A1 | 8/2008 | Wanner et al. | |
| 2008/0251252 A1 | 10/2008 | Schwartz | |
| 2008/0257553 A1 | 10/2008 | Gatlin et al. | 166/280.2 |
| 2008/0257554 A1 | 10/2008 | Zamora et al. | |
| 2008/0261836 A1 * | 10/2008 | Filler et al. | 507/260 |
| 2008/0269082 A1 | 10/2008 | Wilson, Jr. et al. | |
| 2008/0283242 A1 | 11/2008 | Ekstrand et al. | |
| 2008/0287325 A1 | 11/2008 | Thompson et al. | |
| 2008/0314124 A1 | 12/2008 | Sweeney et al. | |
| 2008/0318812 A1 | 12/2008 | Kakadjian et al. | |
| 2009/0067931 A1 | 3/2009 | Curr et al. | |
| 2009/0151959 A1 | 6/2009 | Darnell et al. | |
| 2009/0200027 A1 | 8/2009 | Kakadjian et al. | |
| 2009/0200033 A1 | 8/2009 | Kakadjian et al. | |
| 2009/0203553 A1 | 8/2009 | Gatlin et al. | |
| 2009/0250659 A1 | 10/2009 | Gatlin | 208/236 |
| 2009/0275488 A1 | 11/2009 | Zamora et al. | |
| 2010/0000795 A1 | 1/2010 | Kakadjian et al. | |
| 2010/0012901 A1 | 1/2010 | Falana et al. | |
| 2010/0077938 A1 | 4/2010 | Zamora et al. | |
| 2010/0122815 A1 | 5/2010 | Zamora et al. | |
| 2010/0181071 A1 | 7/2010 | van Petegen | |
| 2010/0197968 A1 | 8/2010 | Falana et al. | |
| 2010/0212905 A1 | 8/2010 | van Petegen | |
| 2010/0252262 A1 | 10/2010 | Ekstrand et al. | |

FOREIGN PATENT DOCUMENTS

| | | | | |
|---|---|---|---|---|
| GB | 775376 | | 10/1954 | |
| GB | 1073338 A | | 6/1967 | |
| GB | 2287049 A | | 9/1995 | |
| JP | 10001461 | | 6/1988 | C07C 211/50 |
| JP | 08151422 | | 11/1996 | |
| JP | 10110115 A | | 4/1998 | |
| JP | 2005194148 A | | 7/2005 | C09C 3/08 |
| WO | 9509215 A1 | | 4/1995 | |
| WO | WO 98/56497 | | 12/1998 | |
| WO | 03101920 A1 | | 12/2003 | |
| WO | 2010083093 A2 | | 7/2010 | |

OTHER PUBLICATIONS

U.S. Appl. No. 12/473,805, filed May 28, 2009, Falana et al.
U.S. Appl. No. 12/510,101, filed Jul. 27, 2009, Falana et al.
U.S. Appl. No. 12/479,486, filed Jun. 5, 2009, Kakadjian et al.
U.S. Appl. No. 12/465,437, filed May 13, 2009, Kakadjian.
U.S. Appl. No. 12/497,399, filed Jul. 2, 2009, Falana et al.

(56) References Cited

OTHER PUBLICATIONS

U.S. Appl. No. 12/784,479, filed May 20, 2010, Zamora et al.
U.S. Appl. No. 12/832,222, filed Jul. 8, 2010, van Petegen.
U.S. Appl. No. 12/758,466, filed Apr. 12, 2010, Thompson et al.
U.S. Appl. No. 12/885,062, filed Sep. 17, 2010, Falana et al.
RU Office Action.
GB Examination/Search Report Nov. 1, 2012.
GB Examination/Search Report May 2, 2012.
GB Examiner/Search Report Nov. 30, 2011.

* cited by examiner

_US 9,085,724 B2_

ENVIRONMENTALLY FRIENDLY BASE FLUIDS AND METHODS FOR MAKING AND USING SAME

BACKGROUND OF THE INVENTION

1. Field of the Invention

Embodiments of this invention relate to environmentally friendly base fluids for use in downhole fluid systems and methods for making and using same.

More particularly, embodiments of the present invention relate to environmentally friendly base fluids for use in downhole fluid systems and methods for making and using same, where the fluids include a solvent system comprising a blend of paraffins, olefins, naphthenes, esters, and oxygenates, where the solvent system has a low viscosity, is a pale-yellow liquid, has a flashpoint >80° C. (175° F.) and has a pour point of about 19° F.

2. Description of the Related Art

Employment of base fluids either in the formulation of drilling fluids for various drilling operations or as carrier for solutes is commonly practiced in the oilfield or related industries. Increasingly, more stringent regulations to curtail use of hazardous or toxic chemicals are being legislated across the Globe. Consequently, use of some chemicals like diesel is prohibitive in some regions while there are wide spread strict regulations for handling and disposal of several others.

A number of biodegradable mineral or synthetic oil base fluids have been disclosed in prior art. U.S. Pat. Nos. 6,455,474 and 6,096,690 disclose environmentally friendly low temperature base oils and drilling fluids made therefrom. U.S. Pat. Nos. 5,189,012 and 4,787,990 disclose low viscosity blends of poly alpha-olefins (PAO) as a means of reducing the cost of suitable, but expensive and limited in supply PAOs as biodegradable oils.

While other environmentally friendly or biodegradable solvent systems have been described in the prior art, there is still an immediate and long felt need in the art for non-hazardous, non-toxic, environmentally friendly and biodegradable solvent systems for use as a base fluid in downhole operations or other similar operations.

SUMMARY OF THE INVENTION

Embodiments of this invention provide base fluids for use in downhole operations, where the base fluids comprise solvent systems include blends of paraffins, olefins, naphthenes, esters, and oxygenates, having low viscosities, having a pale-yellow color, having a flashpoint of >80° C. (175° F.) and having a pour point of about 19° F.

Embodiments of this invention provide drilling fluids including a base fluid of this invention.

Embodiments of this invention provide fracturing fluids including a base fluid of this invention.

Embodiments of this invention provide fluid carriers including a base fluid of this invention.

Embodiments of this invention provide lift fluid including a base fluid of this invention.

Embodiments of this invention provide completion fluids including a base fluid of this invention.

Embodiments of this invention provide stimulating fluids including a base fluid of this invention.

Embodiments of this invention provide methods for drilling, fracturing, completing, stimulating, lifting and/or other downhole operations, where the fluids include a blend of paraffins, olefins, naphthenes, esters, and oxygenates, having low viscosities, having a pale-yellow color, having a flashpoint of >80° C. (175° F.) and having a pour point of about 19° F.

DEFINITIONS OF TERM USED IN THE INVENTION

The following definitions are provided in order to aid those skilled in the art in understanding the detailed description of the present invention.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "surfactant" refers to a soluble, or partially soluble compound that reduces the surface tension of liquids, or reduces inter-facial tension between two liquids, or a liquid and a solid by congregating and orienting itself at these interfaces.

The term "drilling fluids" refers to any fluid that is used during oil and/or gas well drilling operations.

The term "completion fluids" refers to any fluid that is used in oil and/or gas well completion operations.

The term "production fluids" refers to any fluid that is used in oil and/or gas well production operations.

An under-balanced and/or managed pressure drilling fluid means a drilling fluid having a circulating hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydrostatic pressure less than or equal to 9.6 lbm/gal. Most under-balanced and/or managed pressure drilling fluids include at least a density reduction additive. Other additive many include a corrosion inhibitor, a pH modifier and a shale inhibitor.

The term "foamable" means a composition that when mixed with a gas forms a stable foam.

The term "gpt" means gallons per thousand gallons.

The term "ppt" means pounds per thousand gallons.

DETAILED DESCRIPTION OF THE INVENTION

The inventors have found that new solvent systems can be formulated as base fluids for use in making drilling fluids, fracturing fluids, fluid carriers, completion fluids and/or related systems, where the solvent systems include a blend of paraffins, olefins, naphthenes, esters, and oxygenates. The solvent systems have low viscosities, are pale-yellow liquids, have flashpoints of >80° C. (175° F.) and have pour points of about 19° F. The inventors have found that the solvent systems of this invention may be used to formulate drilling fluids, completion fluids, fracturing fluids, fluid carriers for other applications, or related fluid systems.

The inventors have found that the solvent systems may be used to formulate completely green systems. Thus, the inventors are able to design a foamable drilling system including an eco-friendly foamer or plurality of eco-friendly foamers, an eco-friendly defoamer or plurality of eco-friendly defoamers and an eco-friendly base fluid or plurality of eco-friendly base fluid. Embodiments of the present invention also related to fracturing slurries with outstanding properties prepared using the solvent systems of this invention. Unlike other biodegradable synthetic oils that have been previously disclosed, the solvent systems of this invention are economical as base fluids having high flash points, >80° C. In other embodiments, drilling fluids may be formulated with the base fluids of this invention having an extended operating temperature range, a temperature range up to about 450° F. The inventors have found that the fluids of this invention are reusable and possess superior properties compared to diesel, while competing oil base fluids are neither foamable nor give satisfactory foam properties. The present solvent systems do not damage seals of downhole tools. The inventors have found that in fracturing or frac applications, the fluids may be used to formulate slurries that are non-settling and possess high yield viscosity (lineal gel solution) as compared to known base fluids. Products including the solvent systems of this invention have been field tested successfully in an under-balanced drilling operation in Houston, Tex. USA.

Drilling Fluids

Generally, a drilling fluid is used during the drilling of a well. Drilling fluids can be designed for so-called over-balanced drilling (a hydrostatic pressure of the drilling fluid is higher than the pore pressure of the formation), under-balanced drilling (a hydrostatic pressure of the drilling fluid is lower than the pore pressure of the formation) or managed pressure drilling, where the hydrostatic pressure of the drilling fluid is managed depending on the nature of the material through which drilling is occurring. Each type of drilling uses different types of drilling fluids. The compositions of this invention are designed to improve dispersion and stability of the resulting drilling fluids so that cuttings remain suspended for longer periods of time or at temperatures up to 450° F.

Embodiments of the present invention relates to drilling fluids including a base fluid composition of this invention, where the base fluid composition includes blends of biodegradable, non-toxic, non-hazardous solvent including biodegradable paraffins, olefins, naphthenes, esters, and oxygenates having a flashpoint ≥80° C. and a pour point of about 19° F. The drilling fluids may optionally include a drilling fluid additive package including the additives set forth herein or mixtures of the additive set forth herein.

Completion Fluids

Embodiments of the present invention relates to completion fluids including a solvent system of this invention as the base fluid, where the solvent system of this invention include blends of biodegradable, non-toxic, non-hazardous solvent including biodegradable paraffins, olefins, naphthenes, esters, and oxygenates having a flashpoint ≥80° C. and a pour point of about 19° F. The completion fluids may optionally include a completion fluid additive package including the additives set forth herein or mixtures of the additive set forth herein.

Fracturing Fluids

The present invention also relates to methods of fracturing a subterranean formation comprising forming a fracturing fluid including a surfactant system of this invention and pumping the gel or coacervate down a wellbore, in the presence or absence of a proppant and under pressure sufficient to fracture the formation. Proppants suitable for our invention include all the generally used or generally accepted proppant materials such as sand, shells, and other hard particulates. The fluid may be used in the absence of conventional brine-forming salts. Aqueous based gels used for formation fracturing and other well treatment usually employ guar, cellulose, or gums that depend on chemical bonding and are shear-sensitive.

Embodiments of the present invention relates to fracturing fluid compositions including a solvent system of this invention as the base fluid, where the solvent system of this invention include blends of biodegradable, non-toxic, non-hazardous solvent including biodegradable paraffins, olefins, naphthenes, esters, and oxygenates having a flashpoint 80° C. and a pour point of about 19° F. The fracturing fluids may optionally include a fracturing fluid additive package including the additives set forth herein or mixtures of the additive set forth herein. For additional information on fracturing fluid components that may be used with the fracturing fluids of this invention the reader is referred to U.S. Pat. Nos. 7,140,433, 7,517,447, 7,268,100, 7,392,847, 7,350,579, 7,712,535, and 7565933; and United States Published Applications Nos. 20070032693, 20050137114, 20090250659, 20050250666, 20080039345, 20060194700, 20070173414, 20070129257, 20080257553, 20090203553, 20070173413, 20080318812, 20080287325, 20080314124, 20080269082, 20080197085, 20080257554, 20080251252, 20090151959, 20090200033, 20090200027, 20100000795, 20100012901, 20090067931, 20080283242, 20100077938, 20100122815, and 20090275488. These applications and patents are incorporated by reference through the operation of the last paragraph of the specification.

Stimulating Fluids

Embodiments of the present invention relates to stimulating fluid compositions including a solvent system of this invention as the base fluid, where the solvent system of this invention include blends of biodegradable, non-toxic, non-hazardous solvent including biodegradable paraffins, olefins, naphthenes, esters, and oxygenates having a flashpoint ≥80° C. and a pour point of about 19° F. The stimulating fluids may optionally include a stimulating fluid additive package including the additives set forth herein or mixtures of the additive set forth herein.

Compositional Ranges

In drilling fluid, stimulating fluid, completion fluid, and lift fluid embodiments, the base fluid compositions of this invention are used in a range between about 1 vol. % and about 100 vol. % (volume, v/volume, v) of the base fluid (the base fluid is the fluid into which all other components of the final fluid are added). In other embodiments, the base fluids are used in a range between about 10 vol. % and about 90 vol. %. In other embodiments, the base fluids are used in a range between about 30 and about 70 vol. %. In other embodiments, the base fluids are used in a range between about 40 vol. % and about 60 vol. %. In other embodiments, the base fluids make up greater than or equal to about 50 vol. % of the base fluid. In other embodiments, the base fluids make up greater than or equal to about 60 vol. % of the base fluid. In other embodiments, the base fluids make up greater than or equal to about 70 vol. % of the base fluid. In other embodiments, the base fluids make up greater than or equal to about 80 vol. % of the base fluid. In other embodiments, the base fluids make up greater than or equal to about 90 vol. % of the base fluid. In other embodiments, the base fluids make up about 100 vol. % of the base fluid.

In fracturing slurries, the base fluid compositions of this invention are present in a range between about 30 wt. % and about 70 wt. % based on the weight of the final slurry. In other embodiments, the range is between about 30 wt. % and about 60 wt. %. In other embodiments, the range is between about 30 wt. % and about 50 wt. %. In other embodiments, the range is between about 40 wt. % and about 50 wt. %. In other embodiments, the base fluid composition is present in an amount less than or equal to about 70 wt. %. In other embodiments, the base fluid composition is present in an amount less than or equal to about 60 wt. %. In other embodiments, the base fluid composition is present in an amount less than or equal to about 50 wt. %.

Suitable Reagents
Base Fluid Compositions

Suitable base fluid compositions or solvent systems of this invention include, without limitation, blends of biodegradable, non-toxic, non-hazardous solvents including biodegradable paraffins, isoparaffins, olefins, naphthenes, esters, and oxygenates having a flashpoint 80° C. and a pour point of about 19° F. Exemplary examples include HF-1000™, ODC®, LPA®, terpenes and mixture of terpenes derived from citrus plants including d-limonenes, orange terpenes, lemon terpenes, grapefruit terpenes, orange oil, lemon oil, other citrus terpenes, other citrus oils, blends of HF-1000™, ODC®, and/or LPA® with the terpenes and mixtures of terpenes or mixtures and combinations thereof.

Foamers

Suitable foaming agents for use in this invention include, without limitation, any foaming agent suitable for foaming hydrocarbon based drilling fluids. Exemplary examples of foaming agents include, without limitation, silicone foaming agents such as tetra(trimethylsiloxy)silane, fluorinated oligomeric or polymeric foams such as fluorinated methacrylic copolymer, or other similar foaming agents capable of producing a foam in a hydrocarbon or oil-based drilling fluid or mixtures or combinations thereof. Exemplary examples of such foaming agents include, without limitation, DC-1250 available from Dow Corning, Zonyl FSG available from DuPont, APFS-16 available from Applied Polymer, A4851 available from Baker Petrolite, Superfoam available from Oilfield Solutions, Paratene HFA available from Woodrising, DVF-880 available from Parasol Chemicals INC., JBR200, JBR300, JBR400, and JBR500 available from Jeneil Biosurfactant Company, Paratene HFA, Paratene HFB, Paratene MFA, Paratene MFB available from Woodrising Resources Ltd. or mixture or combinations.

Polymers Used in Fracturing Fluids

Suitable polymers for use in this invention include, without limitation, any polymer soluble in the hydrocarbon base fluid. Exemplary polymers include, without limitation, a polymer comprising units of one or more (one, two, three, four, five, . . . , as many as desired) polymerizable mono-olefins or di-olefins. Exemplary examples includes, without limitation, polyethylene, polypropylene, polybutylene, or other poly-alpha-olefins, polystyrene or other polyaromatic olefins, polybutadiene, polyisoprene, or other poly-diolefins, or copolymers (a polymer including two or more mono-olefins or di-olefins) or copolymers including minor amount of other co-polymerizable monomers such as acrylates (acrylic acid, methyl acrylate, ethyl acrylate, etc.), methacrylates (methacrylic acid, methyl methacrylate, ethyl methacrylate, etc), vinylacetate, maleic anhydride, succinic anhydride, or the like, provided of course that the resulting polymer is soluble in the hydrocarbon base fluid.

Gelling Agents Using in Fracturing Fluids

Suitable gelling agents for use in this invention include, without limitation, any gelling agent. Exemplary gelling agents includes phosphate esters, ethylene-acrylic acid copolymer, ethylene-methacrylic acid copolymers, ethylene-vinyl acetate copolymers, ethylene-maleic anhydride copolymers, butadiene-methacrylic acid copolymers, ethylene-methacrylic acid copolymers, styrene-butadiene-acrylic acid copolymers, styrene-butadiene-methacrylic acid copolymers, or other copolymer including monomers having acid moieties or mixtures or combinations thereof. Exemplary examples phosphate ester gelling agents include, without limitation, WEC HGA 37, WEC HGA 70, WEC HGA 71, WEC HGA 72, WEC HGA 702 or mixtures or combinations thereof, available from Weatherford International. Other suitable gelling agents include, without limitation, Geltone II available from Baroid, Ken-Gel available from Imco or the like.

Suitable cross-linking agent for use in this invention include, without limitation, any suitable cross-linking agent for use with the gelling agents. Exemplary cross-linking agents include, without limitation, di- and tri-valent metal salts such as calcium salts, magnesium salts, barium salts, copperous salts, cupric salts, ferric salts, aluminum salts, or mixtures or combinations thereof. Examples cross-linking agent for use with phosphate esters include, without limitation, WEC HGA 44, WEC HGA 48, WEC HGA 55se, WEC HGA 55s, WEC HGA 61, WEC HGA 65 or mixtures or combinations thereof available from Weatherford International.

Defoamers

Suitable defoaming agents for use in this invention include, without limitation, any defoaming agent capable of reducing the foam height of the foamed drilling fluid systems of this invention. Exemplary examples of defoaming agents are polydimethylsiloxane (Down Corning 200 Fluid™, 50 centistokes), low molecular weight alcohols with isopropanol or isopropyl alcohol (IPA) being preferred.

Gases

Suitable gases for foaming the foamable, ionically coupled gel composition include, without limitation, nitrogen, carbon dioxide, or any other gas suitable for use in formation fracturing, or mixtures or combinations thereof.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, $C_6$ to $C_{24}$ synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: $C_1$ to $C_8$ monocarboxylic acids such as formic acid, acetic acid, propanoic acid, butanoic acid, pentanoic acid, hexanoic acid, heptanoic acid, octanoic acid, 2-ethylhexanoic acid, or the like; $C_2$ to $C_{12}$ dicarboxylic acids, $C_2$ to $C_{12}$ unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., $Na^+$, $K^+$ or $NH_4^+$ salts of EDTA; $Na^+$, $K^+$ or $NH_4^+$ salts of NTA; $Na^+$, $K^+$, or $NH_4^+$ salts of Erythorbic acid; $Na^+$, $K^+$ or $NH_4^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; $Na^+$, $K^+$ or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxyethylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaerythritol, neopentyl glycol or the like; Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy propylamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or $C_{10}$ to $C_{24}$ amines or monohalogenated alkyl and aryl chlorides; quaternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples of oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus—Nitrilotriacetamide available from Clearwater International, LLC of Houston, Tex.

Foam Characteristics

Generally, the foamable hydrocarbon drilling fluid systems of this invention from an initial fluid amount of 100 mL, will produce a foam having a foam height of at least 150 mL and a half life of at least 2 minutes. In particular, the produced foam will have a foam height between about least 150 mL and about 500 mL and a half life between about 2 minutes and 15 minutes depending on the application and the exact formulation of the hydrocarbon fluid of this invention. The stability or half life and foam height of the produced foam is controlled by the amount and type of the viscosifying agents in the composition, by the amount and type of the foaming agents in the composition, by the amount of gas and type of gas in the composition, by the temperature of the composition and by the pressure of the composition. Generally, increasing the amount of the viscosifying agents and/or foaming agents leads to increased foam height and foam stability. Generally, the viscosifying agents increase the stability more than the foam height, while the foaming agents increase the foam height. Of course, the foam height is also directly proportional to the amount and type of gas dissolved or absorbed in the fluid.

EXPERIMENTS OF THE INVENTION

Introduction

The inventors designed the present solvent systems to be eco-friendly and biodegradable and at the same time be capable of maintaining shale integrity to insure that the fluids do not result in adverse shale swelling problems producing shale instability. Indeed, the inventors developed oil-based foam systems using the solvent systems of this invention to actualize the benefits of oil-based fluids for use in drilling through active formations. The solvent systems of this invention provide a low cost base fluid for preparing oil-based foam systems. The solvent systems of this invention are capable of achieving savings of over a million dollars in casing operations alone. The inventors have studied the solvent systems of this invention in foamed drilling fluid formulations and in fracturing slurry formulations.

Conclusions

The present solvent systems are suitable base fluids for oil-based foamed drilling fluids and for fracturing slurries. The inventors have successfully prepared foamed drilling fluid systems using the solvent systems of this invention as base fluids in drilling operation. The solvent systems of this invention are suitable in the preparation of high flash point, environmentally benign fluids that are non-settling and have high yield viscosities in fracturing slurry systems.

Result & Discussion

Foamed drilling systems based on the solvent systems of this invention were formulated, where the solvents systems of this invention form a continuous phase. The foamed drilling systems had desirable foam properties and were successfully field tested. The foamed drilling systems are not only highly thermally stable due to the thermal stability of the base fluid comprising a solvent system of this invention, they are also recyclable in a foam-defoam-foam process. In fracturing applications, the solvent systems of this invention can be used to prepare biodegradable, high flash point, fracturing slurries, which are non-settling and possess high viscosities.

Formulations a. Foam Systems

Often, foamers are employed in drilling operations in liquid state; say for ease of handing, for reducing column weight or for forming light weight drilling fluids. While the main surface active chemicals of these systems may not be toxic (e.g., saccharide surfactants), use of non-environmentally benign solvents like alcohols, xylenes, toluene and ethers are common. Because of the negative effects of such chemicals on the ecosystem, it is always desirable to use non-toxic, biodegradable solvent systems or makeup fluids based on non-toxic, biodegradable solvent systems. The solvent systems of this invention were employed to formulate surfactant systems to prepare downhole foamed fluid systems that are non-toxic, biodegradable and non-settling. The downhole fluid systems include non-toxic, biodegradable drilling fluids, completion fluids, fracturing fluids, stimulating fluids, lift fluids, enhancing fluids, production fluids, or other similar fluids.

The inventors have found that the solvent systems of this invention are capable of forming foamed drilling fluids including various concentrations of active foaming agents such as fluoroaliphatic polymeric esters foaming agents, silicon foaming agents, or mixtures and combinations thereof. The resulting formulations are then useable in downhole operations such as drilling, fracturing, stimulating, lifting, stimulating, enhancing, or other similar downhole operations, where the fluids are benign or substantially benign (having little adverse affect on the environment). Of great environmental appeal is suitability of the solvent systems of this invention as a substitute for diesel or other commonly used continuous phase solvents in downhole operations including drilling operations using oil-based drilling fluids, where the other drilling fluid systems might be non-economic, toxic and/or non-biodegradable. The inventors have demonstrated that highly stable drilling fluid systems may be formulated using the solvent systems of this invention as the base fluid for the drilling fluid systems.

Example 1

The present example illustrates the use of HF-1000™ as a non-toxic, biodegradable solvent system designated SS to prepare foamed drilling fluids. The SS based drilling fluids are compared to drilling fluids prepared with Red Diesel.

Table 1 tabulates the foam properties of drilling fluids prepare using SS and Red Diesel.

TABLE 1

Comparison of Diesel and SS as Base Fluids in Foam Systems

| Base Fluid | Conc. | Sea Water (3.5%) | KCl (3.0%) | Condensate | Crude Oil | Heat Stability (24 hr) | Foam Height (mL) | Half Life (min:sec) | Ave Recycle | Fan 35A (Pv, Yp) |
|---|---|---|---|---|---|---|---|---|---|---|
| Red Diesel | 1.0% F1[a] | | | | | | 170 | 4:00 | 200/4:15 | 11, 2 |
| | | 10% | | | | | 170 | 4:00 | | |
| | | 20% | | | | | 170 | 4:00 | | |
| | | 30% | | | | | 170 | 4:00 | | |
| | | | 5% | | | | 160 | 4:00 | | |
| | | | 10% | | | | 160 | 4:00 | | |
| | | | 20% | | | | 160 | 4:00 | | |
| | | | | 5% | | | 160 | 4:00 | | |
| | | | | 10% | | | 170 | 4:00 | | |
| | | | | 20% | | | 180 | 4:00 | | |
| | | | | | 10% | | 160 | 4:00 | | |
| | | | | | 20% | | 160 | 4:00 | | |
| | | | | | | 450° F. | 160 | 4:00 | | |
| SS | 1% F1[a] | | | | | | 170 | 4:00 | 200/4:15 | 5, 2 |
| | | 10% | | | | | 170 | 2:45 | | |
| | | 20% | | | | | 160 | 2:40 | | |
| | | 30% | | | | | 160 | 2:30 | | |
| | | | 5% | | | | 170 | 3:00 | | |
| | | | 10% | | | | 160 | 2:45 | | |
| | | | 20% | | | | 160 | 2:30 | | |
| | | | | 5% | | | 170 | 3:00 | | |
| | | | | 10% | | | 160 | 2:40 | | |
| | | | | 20% | | | 160 | 2:30 | | |
| | | | | | 10% | | 180 | 3:00 | | |
| | | | | | 20% | | 190 | 3:00 | | |
| | | | | | | 450° F. | 160 | 3:40 | | |

[a]F1 is OleoFoam ™C and OleoVis ™HT both available from Weatherford.

The foam properties of the foamed drilling fluid systems shown in Table 1 for Red Diesel and SS are quite comparable and are sufficient for foamed drilling applications. Thus, SS is a robust and versatile solvent system for use as a base fluid for foamed drilling fluid system.

b. Slurry Systems

Embodiments of this invention relate to slurries compositions or formulations prepared using SS as the base solvent system, where the compositions decrease settling of particulate materials in the slurries and increase hydration properties of hydratable particulate materials in the slurries. In slurry system development, two recurring concerns are biodegradability and flammability of the base fluid. The solvent systems of this invention were found to satisfactorily and sufficiently address both of these concerns.

Example 2

Two slurry formulations were prepared using SS and Conosol 145 (a commercially available base oil from Calumet Specialty Partners, USA) formulated independently as base fluid according to the formulations tabulated in Table 2.

TABLE 2

Slurry Composition

| Component | Concentration (%) |
|---|---|
| Base oil (g) | 47.91 |
| Winterizing Agent (Arlacel 83) | 0.48 |
| Clay (Bentone 150) | 2.00 |
| Surfactant Blend (Suspend Aid) | 0.98 |
| Polymer (WGA 15) | 48.63 |
| Total | 100.00 |

The slurries were tested and the test results are tabulated in Table 3.

TABLE 3

SS and Conosol 145 Based Slurries

| Slurry Property | Conosol 145 Based Slurry | SS Based Slurry |
|---|---|---|
| Specific Gravity (25° C.) | 1.048-1.062 | 1.059 |
| Flashpoint (° F.) | >152 | >212 |
| Pour point (° F.) | 0 | 44 |
| Dynamic Settling[a] | 2% | <1% |
| Static Settling[b] | 1% | <1% |
| Hydration Yield (72° F., cP) | 42 | 46 |
| Slurry Viscosity (72° F., cP) | 320-520 | 854[c] |

[a]%, 72° F., 72 hr
[b]%, 105° F., 72 hr
[c](R1:B1 @ 511/s)

The data of Table 3 show physical properties of the slurries prepared using SS and Conosol 145. The data in Table 3 exemplify desirable and superior properties of slurries based on SS as compared to slurries based on Conosol 145. The data show that the SS based slurry has reduced settling (<1%) for WGA 15 polymers (WGA 15 is available from Weatherford) in the SS based slurry as compared to the Conosol 145 base slurry (2.0%) for WGA 15 polymers in the Conosol 145 base slurry. In certain embodiments, the SS slurries of this invention may be formulated having a flash point temperature higher than 212° F. In other embodiments, higher yield viscosity slurries of the lineal gel solution are obtainable with SS than with Conosol 145.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. An oil-based fluid composition for use in downhole applications comprising:
   from about 30 vol.% to about 70 vol.% of an oil base fluid comprising blends of biodegradable, non-toxic, non-hazardous solvents including biodegradable isoparaffins, terpenes, or mixtures and combinations thereof having low viscosities, having a flashpoint of >80° C. (175° F.), is foamable, having a pour point of about 19° F. (−7.2° C.), and has an operating temperature range up to about 450° F., and
   an additive comprising at least a foaming agent and a gas in concentrations sufficient to produce a foamed downhole fluid having a foam height of at least 150 mL and a half life of at least 2 minutes,
   where the foaming agents are selected from the group consisting of fluoroaliphatic polymeric esters foaming agents, silicon foaming agents, or mixtures and combinations thereof, and
   where the oil-based fluid composition comprises a foamed oil-based drilling fluid, a foamed oil-based completion fluid, a foamed oil-based fracturing fluid, or a foamed oil-based stimulating fluid.

2. The composition of claim 1, wherein the composition comprises blends of isoparaffins and terpenes.

3. The composition of claim 2, wherein the terpenes comprise d-limonenes, orange terpenes, lemon terpenes, grapefruit terpenes, orange oil, lemon oil, other citrus terpenes, other citrus oils, or mixtures and combinations thereof.

4. The composition of claim 1, wherein the composition comprises blends of isoparaffins and mixtures of terpenes.

5. The composition of claim 4, wherein the terpenes comprise d-limonenes, orange terpenes, lemon terpenes, grapefruit terpenes, orange oil, lemon oil, other citrus terpenes, other citrus oils, or mixtures and combinations thereof.

6. The composition of claim 1, wherein the composition comprises blends of isoparaffins.

7. The composition of claim 1, wherein the fluid is a drilling fluid and further comprising a drilling fluid additive package.

8. The composition of claim 1, wherein the fluid is a fracturing fluid and further comprising a fracturing fluid additive package.

9. The composition of claim 1, wherein the fluid is a fluid carrier and further comprising a carrier fluid additive package.

10. The composition of claim 1, wherein the fluid is a lift fluid and further comprising a lift fluid additive package.

11. The composition of claim 1, wherein the fluid is a completion fluid and further comprising a completion fluid additive package.

12. The composition of claim 1, wherein the fluid is a stimulating fluid and further comprising a stimulating fluid additive package.

13. A method for making an oil-based downhold fluid comprising:
    adding an additive package to an oil base fluid comprising a blend of biodegradable, non-toxic, non-hazardous solvents including biodegradable isoparaffins, terpenes, or mixtures and combinations thereof, where the base fluid has a low viscosity, has a flashpoint of >80° C. (175° F.), has a pour point of about 19° F. (−7.2° C.), is non-toxic, is biodegradable, and has an operating temperature range up to about 450° F.,
    where the additive package comprises at least a foaming agent and a gas in concentrations sufficient to produce a foamed drilling fluid having a foam height of at least 150 mL and a half life of at least 2 minutes,
    where the foaming agents are selected from the group consisting of fluoroaliphatic polymeric esters foaming agents, silicon foaming agents, or mixtures and combinations thereof, and
    where the oil-based downhole fluid comprises a foamed oil-based drilling fluid, a foamed oil-based completion fluid, a foamed oil-based fracturing fluid, or a foamed oil-based stimulating fluid.

14. The method of claim 13, wherein the base fluid comprises blends of isoparaffins and terpenes.

15. The method of claim 14, wherein the terpenes comprise d-limonenes, orange terpenes, lemon terpenes, grapefruit terpenes, orange oil, lemon oil, other citrus terpenes, other citrus oils, or mixtures and combinations thereof.

16. The method of claim 13, wherein the base fluid comprises blends of isoparaffins and mixtures of terpenes.

17. The method of claim 16, wherein the terpenes comprise d-limonenes, orange terpenes, lemon terpenes, grapefruit terpenes, orange oil, lemon oil, other citrus terpenes, other citrus oils, or mixtures and combinations thereof.

18. The composition of claim 13, wherein the base fluid comprises blends of isoparaffins.

* * * * *